Oct. 27, 1964   R. H. LA VENTURE   3,154,204
TOW-BAR
Filed Dec. 13, 1961   2 Sheets-Sheet 1
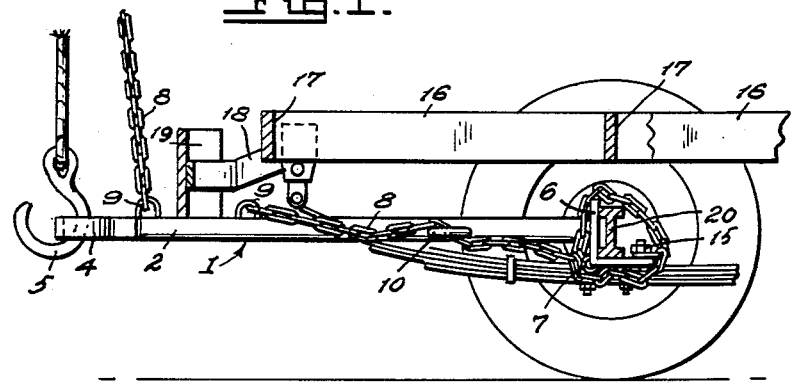
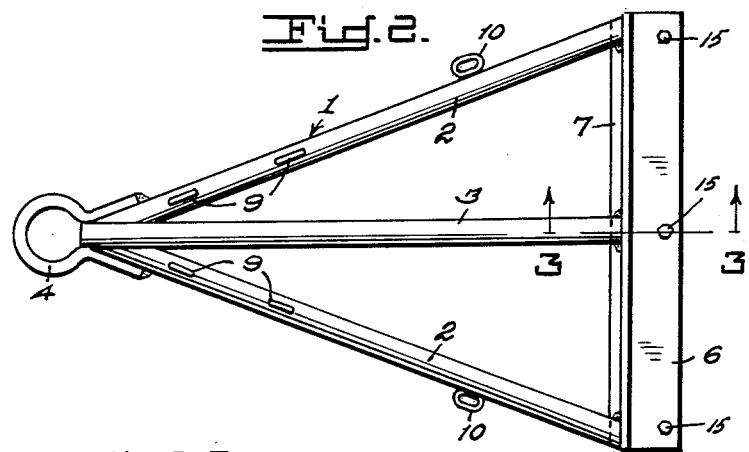
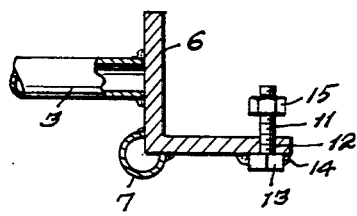
INVENTOR.
Robert H. LaVenture
BY
S. J. Rotondi & A. J. Dupont Oct. 27, 1964  R. H. LA VENTURE  3,154,204
TOW-BAR
Filed Dec. 13, 1961  2 Sheets-Sheet 2
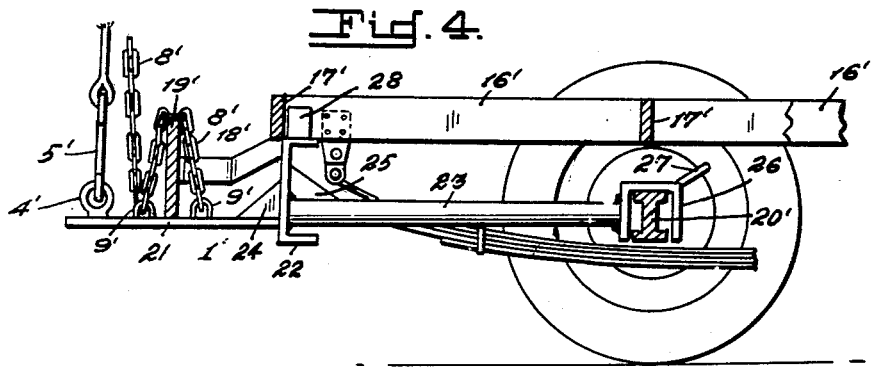
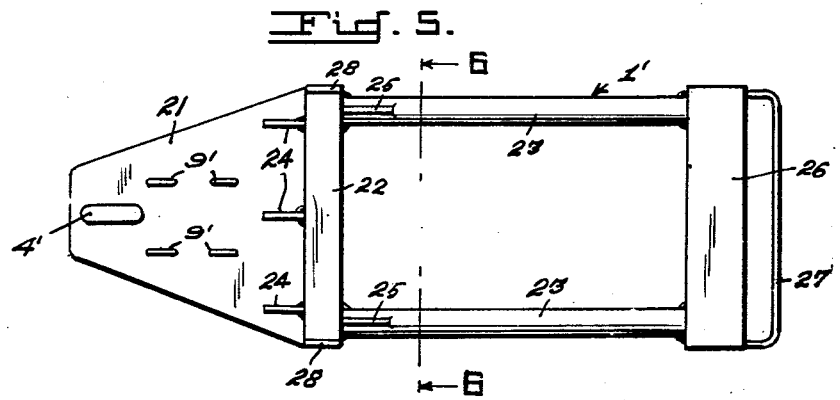
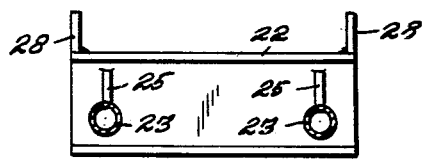
INVENTOR.
Robert H. LaVenture
BY
S. J. Rotondi & A. J. Dupont

United States Patent Office 3,154,204
Patented Oct. 27, 1964

3,154,204
TOW-BAR
Robert H. La Venture, Box 95, R.F.D.,
Mooers Forks, N.Y.
Filed Dec. 13, 1961, Ser. No. 159,193
1 Claim. (Cl. 214—86)
(Granted under Title 35, U.S. Code (1952), sec. 266)

The invention described herein may be manufactured and used by or for the Government for governmental purposes without the payment to me of any royalty thereon.

This invention relates to a tow-bar and more particularly to a device for lifting and towing vehicles.

Heretofore, towed vehicles, such as trucks or passenger cars, were lifted by the bumper alone by the tow car crane which resulted in damaged or broken bumpers and also permitted dangerous side-to-side sway of the vehicle being towed.

Therefore, it became evident that means must be devised to transfer the weight of the towed vehicle to some other more sturdy portion of the car and also to steady the towed car while being towed.

The present invention is designed to overcome these difficulties and comprises a forwardly tapering bed with a large eye at one end to accommodate the tow truck's lifting hook. The other side of the bed is provided with a cross member for attachment to the front axle of the towed vehicle, its bumper resting on the bed. Chains lash the cross member to the axle of the towed vehicle to steady it from any swaying motion.

It is an object of this invention to provide a tow-bar which will prevent side to side sway of the towed vehicle while being towed.

Another object of the invention is to lift the front end of the towed vehicle without putting most of the vehicle's weight on its bumper.

It is a final object of this invention to provide a tow-bar that is inexpensive in manufacture and which may be attached to a vehicle to be towed with a minimum of time and by a single operator.

The specific nature of this invention as well as other objects and advantages thereof, will clearly appear from a description of a preferred embodiment as shown in the accompanying drawings in which:

FIGURE 1 is a side view of the tow-bar of the invention in use and showing in cross section schematically the outline of the front portion of a vehicle frame and axle, such as an automobile or light truck;

FIGURE 2 is a top plan view of the tow-bar;

FIGURE 3 is a cross section taken along lines 3—3 of FIGURE 2;

FIGURE 4 is a view similar to FIGURE 1 and illustrating a modified tow-bar for use with heavy vehicles;

FIGURE 5 is a top plan view of the tow-bar of FIGURE 4 and,

FIGURE 6 is a cross section view taken along lines 6—6 of FIGURE 5.

Referring to the drawing wherein reference character 1 represents the tow-bar of the invention in its entirety.

Tow-bar 1 is composed of a forwardly tapering bed and includes a pair of side tubes 2 arranged in forwardly converging fashion and a medial tube 3, best viewed in FIGURE 2.

At the apex of the tapered bed a ring 4 is provided for receiving a crane hook 5 of a tow truck (not shown).

An angle iron 6 is secured to the other end of the tapered bed.

A tube 7 is secured to the outer corner of the angle beam 6 for preventing wear on the angle beam 6 by safety chains 8 which are secured to rings 9 on side tubes 2.

Guide members 10 are provided for supporting safety chains 8.

The entire structure of tow-bar 1 is preferably welded to form a unitary member which provides ruggedness and durability.

A series of bolts 11 are provided in aligned relationship in the bottom of angle iron 6. These bolts 11 are secured in aligned holes 12 and their heads 13 are welded to the under side of the angle iron bottom as at 14.

Nuts 15 are provided on bolts 11 for securement of chains 8 to bolts 11.

The manner in which the tow-bar is used is seen in FIGURE 1 showing the frame of a vehicle in tow. The frame comprises a pair of longitudinal members 16 and cross members 17. A bumper 19 is also illustrated and is generally connected to the frame in most vehicles, by resilient means such as curved spring elements 18.

The vehicle front axle 20 is shown in this view.

In use the tow-bar 1 is placed under the vehicle frame with the angle beam 6 against the axle 20 as shown.

Safety chains 8 are then passed through guides 10, down under axle 20 and wrapped around both the axle 20 and angle beam 6 and the end of the chain 8 is bolted on bolts 11 and secured by nuts 15.

Any arrangement of the safety chains 8 may be employed as is expedient.

It will be ssen that, as ring 4 is placed on hook 5 of the tow car (not shown) and lifted, bumper 19 rests firmly on the tow-bar 1 between the forwardly pair of rings 9 and the rearwardly pair of rings 9 thus preventing and side sway of the towed vehicle. Also, the angle iron 6, when firmly lashed to the front axle 20, prevents any side slipping of the tow-bar 1.

Since most bumpers are mounted in a flexible manner to the vehicle frame and are therefore capable of considerable movement, both vertically and horizontally, it is obvious that tow-bar 1 would upon continued lifting, first contact the bumper 19 and then the forward cross member 17 of the frame of the vehicle causing first the bumper 19 and then the cross member 17 to come to rest squarely on the tow-bar, thus relieving strain on the bumper 19, which would be pushed upwards.

Hence, the full weight of the towed vehicle would not be borne by the bumper 19 alone.

The tow-bar 1 can be made of varying size, i.e. length, width or size of the angle iron 6 to accommodate different sized vehicles.

A modified form of the invention is shown in FIGURES 4–6 and is for use with heavier vehicles, such as large trucks or buses.

The tow-bar in this form is indicated generally by reference character 1'.

Tow-bar 1' consists of a flat triangular shaped plate 21 having a lifting ring 4' at its apex.

A channel iron 22 is secured by welding to the other end of plate 21 and a pair of parallel tubes 23 is secured by welding to the channel iron 22 as shown in FIGURES 4 and 5.

Triangular webs 24 are welded to the plate 21 and the forward wall of channel iron 22, while triangular webs 25 are welded to the rearward wall of channel iron 22 and the tops of parallel tubes 23 as shown in FIGURE 5.

An axle engaging member 26 which, as shown in FIGURES 4 and 5 may be an inverted U-channel beam, is welded to the rearward ends of tubes 23 and a handle 27 is welded to member 26 for lifting the tow-bar when placing or removing it from the axle 20'.

Rings 9' are provided on the top side of plate 21 for securement of safety chains 8'.

A pair of ears 28 are welded, one to each end of the top side of channel iron 22 for preventing side slippage of the tow-bar away from the frame af the towed vehicle.

In use, the tow-bar 1' is placed under the frame of the vehicle with channel member 26 over the front axle 20' of the vehicle.

The bumper 19' will rest on plate 21 while channel iron 22 will support frame members 16'.

Ears 28 will lie inside longitudinal members 16' and prevent members 16' from slipping too far to one side and off channel iron 22.

Safety chains 8' are employed in any expedient manner, such as around the bumper 19', to the tow truck (not shown) or the axle.

Thus, where the tow-bar 1' is lifted by hook 5', the weight of the vehicle will be borne by the channel iron 22 and the bumper is not moved at all. (Bumpers of heavy vehicles are not as resilient as on lighter ones.)

A safety chain (not shown) may be wrapped around channel iron 26 and axle 20' if desired, but should not be necessary when the vehicle is being towed along smoothly paved roads.

One operator can also handle the tow-bar 1' since by releasing the chains 8' and hook 5' the tow-bar 1' will drop down at its forward end and then the operator may lift the rearward end off axle 20' by handle 27 and drag it from under the vehicle.

It will be apparent from the foregoing, that a novel and useful tow-bar has been devised and one that may be quickly put in use by a single operator.

Variations and modifications may be effected without departing from the scope of the novel concept of the present invention as set forth in the appended claim.

What is claimed is:

A tow-bar for a vehicle including a bed portion for simultaneously supporting the bumper and frame of the vehicle when said vehicle is being towed, said bed comprising a pair of forwardly converging tubes and a medially disposed tube, said tubes being rigidly secured together at their front ends, a ring rigidly secured to said front ends of said tubes for the engagement of a lifting device therein and a transversely disposed angle beam rigidly secured to the rearward end of said bed for detachable engagement with the axle of the vehicle.

References Cited in the file of this patent

UNITED STATES PATENTS

| | | |
|---|---|---|
| 1,353,094 | Trumpour | Sept. 14, 1920 |
| 1,657,655 | Ashton | Jan. 31, 1928 |
| 1,683,020 | Biegler | Sept. 4, 1928 |
| 2,197,406 | Fleming et al. | Apr. 16, 1940 |
| 2,447,250 | Holloway | Aug. 17, 1948 |
| 2,700,554 | Branstrator | Jan. 25, 1955 |
| 2,933,211 | Smith | Apr. 19, 1960 |

FOREIGN PATENTS

| | | |
|---|---|---|
| 445,931 | Great Britain | Apr. 9, 1936 |